C. T. FORTNEY.
HORSESHOE.
APPLICATION FILED JULY 18, 1916.
1,219,281.
Patented Mar. 13, 1917.
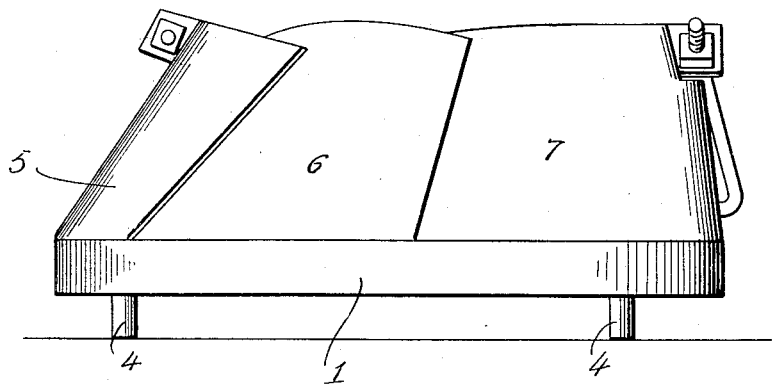
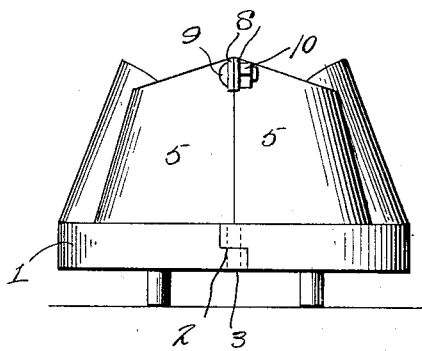
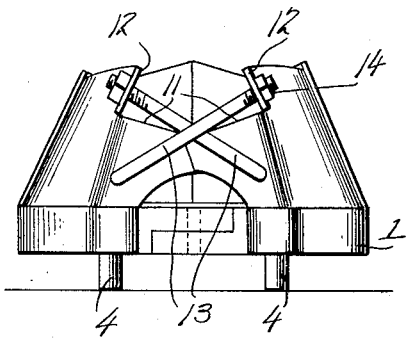
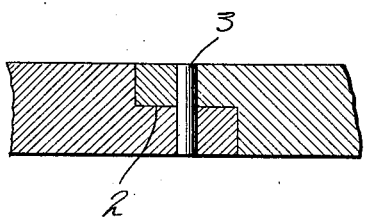
INVENTOR
Christ T. Fortney.
WITNESSES
BY
ATTORNEY

UNITED STATES PATENT OFFICE.

CHRIST T. FORTNEY, OF WEST PRAIRIE, WISCONSIN.

HORSESHOE.

1,219,281.  Specification of Letters Patent.  Patented Mar. 13, 1917.

Application filed July 18, 1916. Serial No. 109,945.

*To all whom it may concern:*

Be it known that I, CHRIST T. FORTNEY, a citizen of the United States, residing at West Prairie, in the county of Vernon and State of Wisconsin, have invented certain new and useful Improvements in Horseshoes, of which the following is a specification.

This invention has relation to horse shoes, and the nature and objects thereof will be readily apparent to those skilled in the art to which it appertains, in the light of the following explanation of the accompanying drawings, illustrating, what I now believe to be the preferred embodiment or mechanical expression of my invention, from among other forms and arrangements within the spirit thereof, or the scope of the appended claims.

However, an object of the invention is to provide a horse shoe embodying means whereby the same may be secured to the horse's hoof without the use of nails or similar fastenings.

Another object of the invention is to provide a horse shoe and fastening means therefor, of an adjustable character whereby the shoe may be applied to hoofs of different sizes, and shapes.

In addition to the foregoing, my invention comprehends improvements in the details of construction and arrangement of parts, to be hereinafter described and particularly set forth in the appended claims.

In the accompanying drawings, in which similar and corresponding parts are designated by the same characters of reference throughout the several views in which they appear;

Figure 1 is a view in side elevation of a horse shoe embodying fastening means, according to my invention.

Fig. 2 is a view thereof in front elevation.

Fig. 3 is a view in end elevation, and

Fig. 4 is a detail section taken through the joint between the sections of the shoe.

With reference to the drawings, 1 indicates the mating sections of a horse shoe, connected in overlapping relation at the forward portion of the shoe, the ends being cut away at 2 to form the joint and connected together by a rivet or the like 3. The shoe when the sections are properly connected, is to all intents and purposes similar to the conventional horse shoe with the exception of its sectional character as before said. Calks 4 are provided at the forward intermediate portion of the shoe and at the rear terminals thereof.

Each section of the horse shoe is provided with a forward plate 5, secured to its upper surface, and intermediate plate 6 and a rear plate 7, both connected to the shoe section in a manner similar to the plate 5, and all of said plates inclined inward, at an angle corresponding to the inclined outer surface of a horse's hoof. The forward plates 5 of each shoe section are formed at their upper edges with integral apertured lugs 8 through which a bolt 9 is passed and secured by a nut 10. The rear edges of the rear plates 7 are cut away at their upper edges as at 11, and the cut away portion bent outwardly to form spaced lugs 12. Bolts 13 are passed through apertures in the lugs 12, and the bolt from one lug secured in an opening in the opposite plate, thereby disposing the bolts crosswise as shown in Fig. 3. Nuts 14 are applied to the bolts, and it will be obvious that by tightening the nuts, the rear plates will be drawn toward each other. The plates of each section are preferably disposed in overlapping relation.

In use, the rear bolts 13 are disengaged from the lugs, and the forward bolt 9 loosened sufficiently to permit separation of the horse shoe sections, so that the shoe and plates may be applied to the hoof. Owing to the jointed connection of the shoe sections, the sections may be adjusted relatively toward or from each other to accommodate hoofs of various widths. After the device is applied, the bolts at the rear of the shoe may be properly associated in the plates and the nuts tightened to bind the plates to the hoof. The forward bolt is then tightened, and the shoe will be securely held in place. The present invention will effectually obviate the necessity for threaded fastenings or driven fastenings for securing shoes to the hoof, whereby the hoof is often damaged and the animal permanently injured.

While I have illustrated and described my invention with some degree of particularity, I realize that in practice various alterations thereover may be made, and I therefore reserve the right and privilege of changing the form of the details of construction, or otherwise altering the arrangement of the correlated parts without departing from the spirit of the invention or the scope of the appended claims.

Having thus fully described my invention what I claim as new and desire to secure by Letters Patent is:—

1. A horse shoe formed of sections, connected at their forward ends to provide relative movement, means for fastening the shoe to the hoof comprising a plurality of plates secured to each section in overlapping relation, adapted to engage and conform to the sides of the hoof, and having means for drawing together certain of the plates of opposite sections to bind them all to the hoof.

2. A horse shoe formed of sections, connected at their forward ends to provide relative movement, means for fastening the shoe to the hoof comprising forward, intermediate and rear plates on each section, in overlapping relation adapted to engage and conform to the sides of the hoof, lugs on the forward and rear plates in opposed relation, and bolts connecting the lugs to draw said plates together to bind them, and the intermediate plates to the hoof.

3. A horse shoe formed in sections connected at their forward ends to provide relative movement, having means for fastening the shoe to the hoof comprising forward, intermediate, and rear plates on each section in overlapping relation, and adapted for slight relative movement to engage and conform to the sides of the hoof, lugs on the meeting edges of the forward plates, a bolt extending through the lugs to bind the plates together, lugs on the edges of the rear plates disposed in spaced relation, and a pair of bolts extending through said lugs in opposite directions and in crossed relation engaging the opposite plates, whereby said plates may be drawn together to bind the same to the hoof.

In testimony whereof I affix my signature in presence of two witnesses.

CHRIST T. FORTNEY.

Witnesses:
MYRTLE LARSON,
MARY E. MORSE.

Copies of this patent may be obtained for five cents each, by addressing the "Commissioner of Patents, Washington, D. C."